United States Patent [19]

Schmidt

[11] 4,208,959
[45] Jun. 24, 1980

[54] GRILL DEVICE

[75] Inventor: Klaus Schmidt, Ritterhude, Fed. Rep. of Germany

[73] Assignee: EWG Import u. Export GmbH & Co. Handelskommanditgesellschaft, Fed. Rep. of Germany

[21] Appl. No.: 896,471

[22] Filed: Apr. 14, 1978

[51] Int. Cl.² ............................................. A47J 37/07
[52] U.S. Cl. ................................. 99/421 HV; 99/339
[58] Field of Search ............ 99/421 H, 421 HV, 339, 99/389, 446, 447; 126/9, 25

[56] References Cited

U.S. PATENT DOCUMENTS

| 2,638,888 | 5/1953 | Molla | 999/339 X |
| 2,821,187 | 1/1958 | Tescula | 99/339 X |
| 2,925,028 | 2/1960 | Haynes et al. | 99/447 X |
| 3,025,784 | 3/1962 | Williams | 99/446 |
| 3,079,208 | 2/1963 | Compton | 99/339 X |
| 3,091,170 | 5/1963 | Wilson | 126/25 A X |
| 3,178,558 | 4/1965 | Oatley | 99/421 H X |
| 3,182,585 | 5/1965 | Rensch et al. | 126/25 A X |
| 3,358,587 | 12/1967 | Hunt et al. | 99/447 X |
| 3,742,838 | 7/1973 | Luschen et al. | 99/421 H X |
| 4,106,473 | 8/1978 | Wandel | 99/421 HV X |

Primary Examiner—Harvey C. Hornsby
Assistant Examiner—Arthur O. Henderson
Attorney, Agent, or Firm—Wood, Herron & Evans

[57] ABSTRACT

An improved grill device having, in one preferred form, two coal boxes, each coal box being swingable on a horizontal axis between a generally horizontal position and a generally vertical position, the axes being parallel one to another. Novel box support structure is provided for easily locating either coal box in each of the horizontal and vertical positions as selected by the user. In the preferred form, the improved grill device includes a base plate and opposed side plates, the side plates being swingable relative to the base plate between an erect use position and an overlying storage position. A coal box swingable on a horizontal axis relative to the base plate is connected between the side plates when the side plates are erected. Novel box support structure cooperates with novel side plate support structure to maintain the side plates and coal box in the assembled and erect use position.

10 Claims, 8 Drawing Figures

GRILL DEVICE

This invention concerns grills. More particularly, this invention relates to an improved grill device.

Outdoor grill devices are, of course, very well known to the prior art. One basic type of known grill structure includes a coalbox and a frame, the coalbox being positionable in either a horizontal or vertical position on an axis parallel to the front edge of that coalbox. Grill devices of this type have found significant useage in recent years, especially for private house use. In its horizontal use position, the coalbox can be used for the grilling of sausages, steaks and other flat meats on a grate, while in its vertical use position the coalbox permits the cooking and browning of poultry and other round meats on a spit. Set up preferably in the owner's garden, such a grill device may become the culinary center of, e.g., a garden party. One such prior art grill structure is disclosed in German Pat. No. 2,205,401.

One practical problem associated with this prior art grill structure, however, is that all guests at a party can be served at the same time only when everyone desires a flat meat or poultry, e.g., steaks or chicken legs, cooked on a horizontal grate, or a round meat or poultry, e.g., ham or whole chicken, cooked on a spit. In other words, the prior art grill structure is adapted to cook flat meats on the grate or round meats on the spit, but not both.

It has been a primary objective of this invention, therefore, to provide an improved grill device which has novel structure that allows two different types of meats or poultries to be simultaneously cooked without interference of one with the other, i.e., that allows a flat meat or poultry item to be cooked on a horizontal grate while simultaneously allowing a round meat or poultry item to be cooked on a spit. It has been a secondary objective of this invention to provide such an improved grill device that is easily collapsible and erectable between a use position and a storage position so that the grill device may be easily stored when not in use.

In accord with these objectives, and according to the preferred embodiment of the improved grill device of this invention, the grill device includes two coalboxes rotatably mounted between two sideplates, both coalboxes being supported by novel support means in one of a horizontal and a vertical position as selected by the user. When both coalboxes are horizontal, a large grilling surface is established for flat meat and poultry items. When one coalbox is horizontal and the other vertical, flat meat or poultry items can be cooked on the horizontal box and round meat or poultry items can be cooked on a spit by the vertical coalbox, e.g., one coalbox can be used for the grilling of steaks while the other can cook or brown a whole chicken on a spit. When both coalboxes are in the vertical position, round meat or poultry items can be cooked significantly faster on a spit between those boxes than would be the case if both boxes were horizontal. p The novel box support means insures ease of positioning and securing the coalboxes in both the horizontal and vertical positions. In accord with the invention, and in preferred form, the box support means is partially carried by the grill's side plates and partially carried by the ends of the coalboxes, and includes, for each end of a coalbox, a horizontal stop-face and a vertical stop-face on the box and on the side plate which cooperate to maintain the box in either a horizontal or a vertical position. The stop-faces are structured so that turning of each coalbox from the horizontal to the vertical and vice-versa is easy to accomplish, and so that location of each box in the desired position is secure. The stop-faces are further structured so that assembly and disassembly, i.e., erecting and collapsing, of the grill between use and storage positions is easily achieved.

Other objectives and advantages will be more apparent from the following description, taken in conjunction with the drawings in which.

Figure 1:
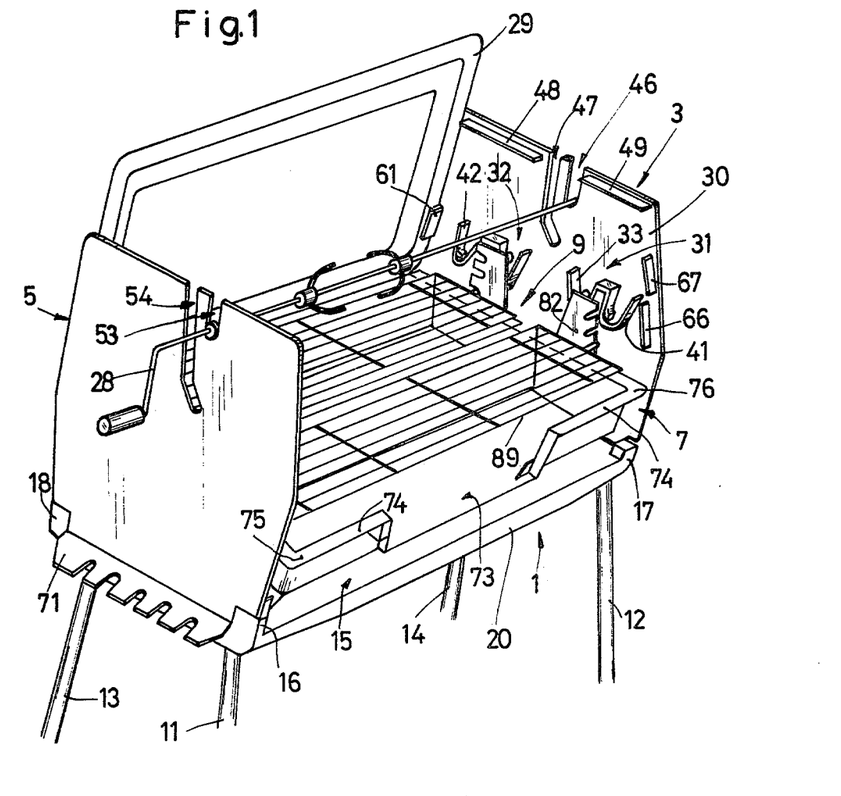
FIG. 1 is a perspective view illustrating an improved grill device in accord with the principles of this invention.

The improved grill device, as shown in FIG. 1, basically consists of a base that includes a one-piece baseplate 1 and two one-piece sideplates 3, 5. The grill also includes two coalboxes 7, 9, as well as a spit 28 and pans 29, 96 mounted on the base. The base itself is supported upon four legs 11–14. The baseplate 1, sideplates 3, 5, and coalboxes 7, 9 are simple in form, and can be inexpensively fabricated from, e.g. cast iron.

Figure 2:
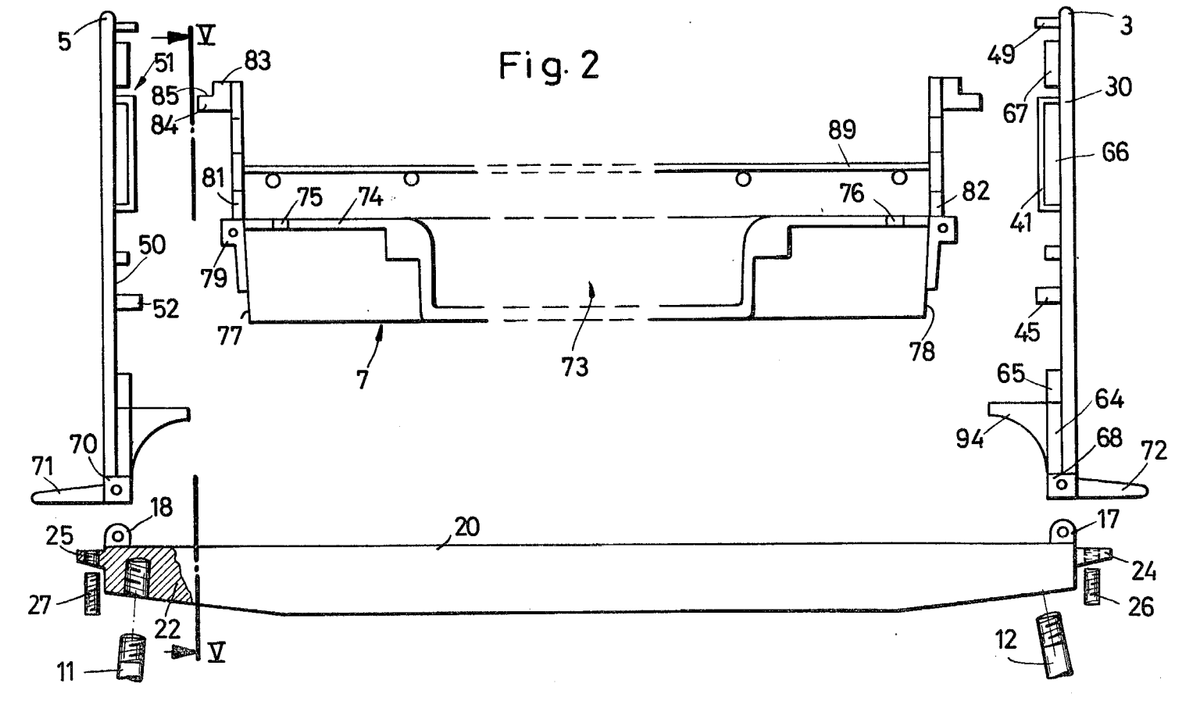
FIG. 2 is a front elevation view of the grill's major component parts before assembly.
Figure 5:
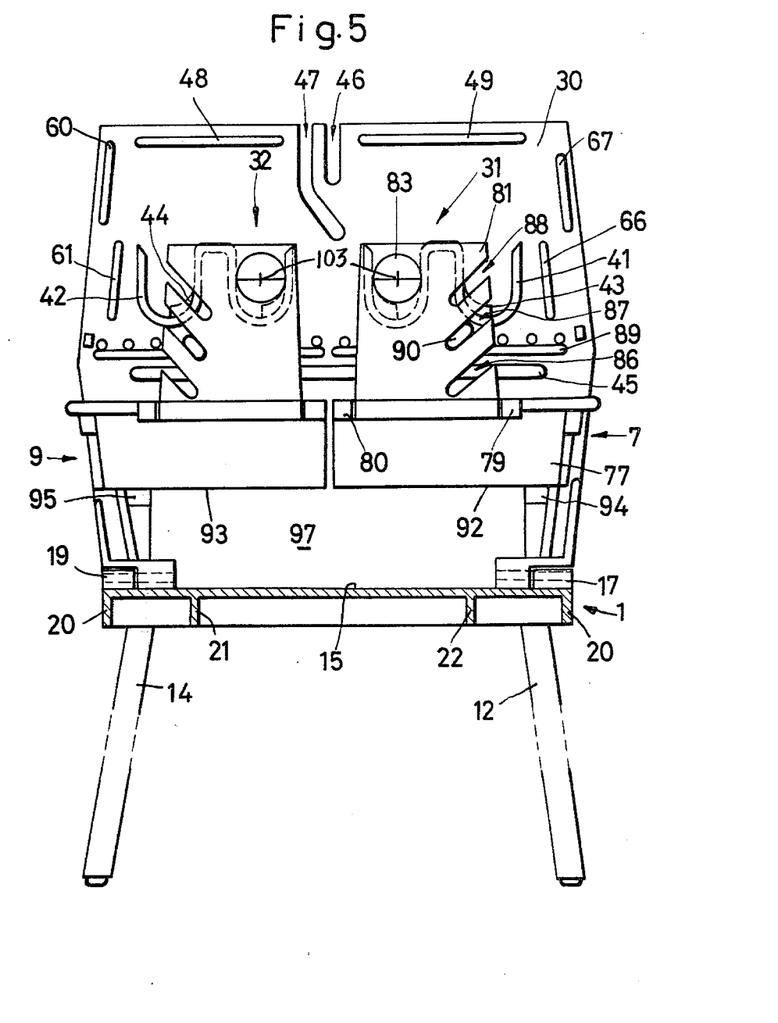
FIG. 5 is a side sectional view taken along line V—V of FIG. 2, but with the grill fully assembled and in a first operating position.

The rectangular baseplate 1 has a flat top surface 15, and includes a connecting block 16, 17, 18, 19 on each of its corners, see FIGS. 2 and 5. A short apron 20, projecting outward and down, is provided on the edge of baseplate 1. Two reinforcement ribs 21, 22, traversing the entire width of the baseplate 1, are provided on the underside of the baseplate.

Sideplate support structure includes a tab 24, 25 located approximately in the middle of each broad side of the baseplate 1, the tabs projecting outward to receive a threaded pin 26, 27, respectively, through a vertical threaded bore therein. Each of the legs 11–14 is provided with threads on its top segment, and each leg is screwed into the threaded bores 23 provided in the bottom section of the baseplate.

Figure 4:
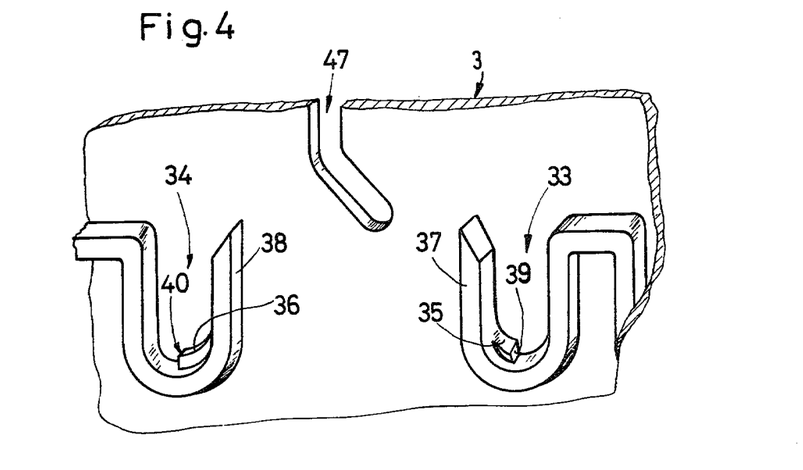
FIG. 4 is an enlarged perspective view of a section of a sideplate illustrating a portion of the box support structure mounted to that sideplate.

Each of the grill's sideplates 3, 5 has on its inner surface 30, 50 several raised and differently formed ridges, some of which comprise part of the coalbox support means or holding device 31, 51, and others of which serve as supports and guides for one or more draft deflectors or grease-catch pans 29, 96, see FIGS. 1, 4 and 5. With regard to the coalbox support means, there is provided, somewhat above center and in the right and left halves of the sideplates 3, 5, holding devices 31, 32, each of which includes a U-shaped cradle 33, 34 open at the top and half-round at the bottom, see FIGS. 1 and 4. A striker cam 35, 36 is formed on the inner part of an arm 37, 38 in the lower section of each cradle 33, 34. The length of the striker cam 35, 36 can be greater or equal to the distance which the cradle projects from the respective sideplates' inner surface 30, 50. Each striker cam 35, 36 has the shape of a quartercircle on its outward end from the sideplate, and each forms a vertical stop-face 39, 40 which flows seamless into its associated arm 37, 38. On the outboard side of each cradle 33, 34 is located a second cradle 41, 42 which is identical in shape to the first associated cradle 33, 34, and which has likewise a striker cam and a corresponding vertical stop-face. Thus, each coalbox 7, 9 is provided with an inner and an outer coalbox cradle support pair on each sideplate 3, 5, i.e., coalbox 7 is provided with inner cradle 33 and outer cradle 41, and coalbox 9 is provided with inner cradle 34 and outer cradle 42, compare FIGS. 4 and 5. The sideplates 3, 5 also mount, on their inside faces 30, 50, coalbox support means in the form of horizontal stop-faces structured as support blocks 94, 95 on which coalboxes 7, 9 rest when in the horizontal position shown in FIGS. 1 and 5.

Figure 6:
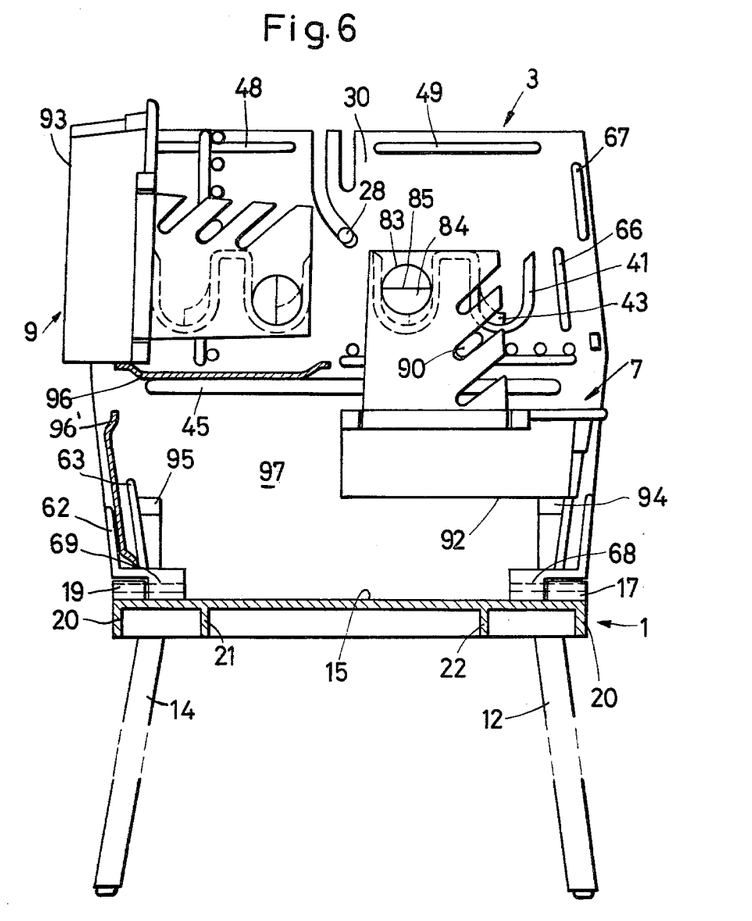
FIG. 6 is a side sectional view similar to FIG. 5, but with the grill in a second operating position.
Figure 7:
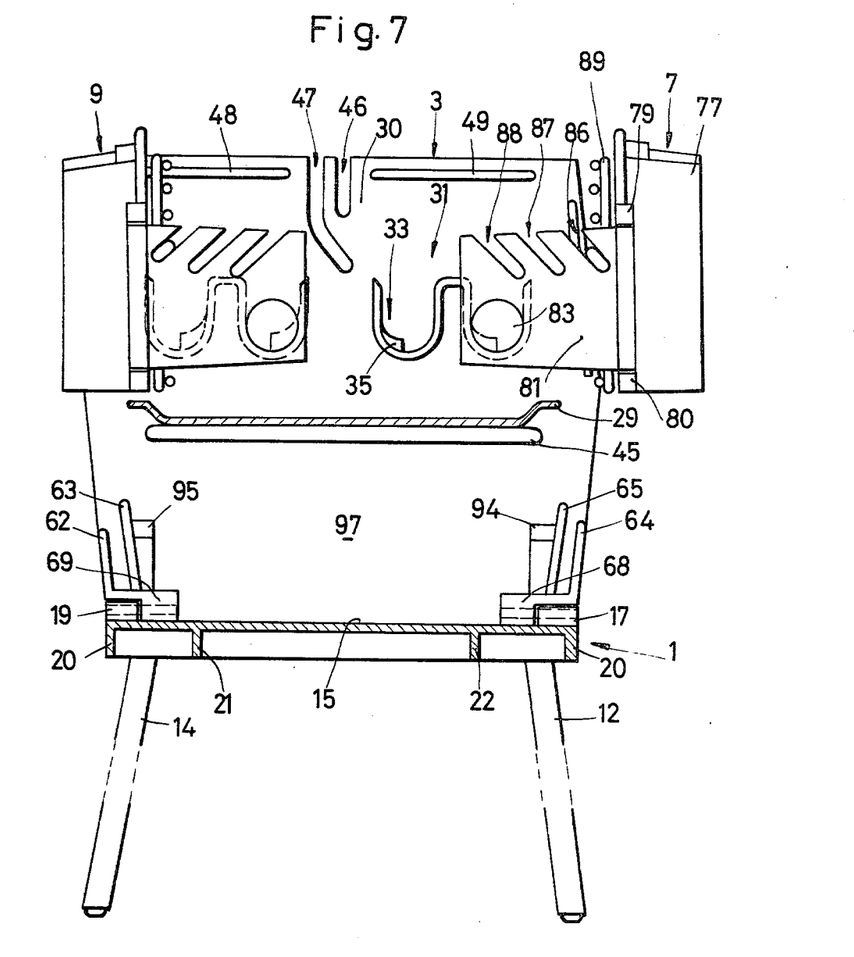
FIG. 7 is a side sectional view similar to FIG. 6, but with the grill in a third operating position.

With regard to the air deflector pan and grease pan support means and horizontal support ledges 45, 52 are located on the sideplates inner surfaces 30, 50, each ledge extending across the major portion of the width of its related sideplate 3, 5, see FIGS. 2, 6 and 7. The ledges 45, 52 can be used to support an inserted grease-catch pan 29 or 96 as described in detail below. The horizontal support ledges 45, 52 are located beneath the coalbox cradles 33, 34, and 41, 42 at a certain height above the baseplate 1 so that, when the coalboxes 7, 9 are in a vertical position as shown in FIG. 7, the grease-catch pan 29 can be inserted, thereby forming a useful warming chamber 97 between itself and the baseplate 1. Near to and parallel to the top and side edges of each of the sideplates 3, 5 are ledge pairs 48, 49; 60, 61; 62, 63; 64, 65; and 66, 67, which are located at various intervals, see FIGS. 5-7. The ledge pair 48, 49 can be used to support a cover sheet, e.g., the grease-catch pan 29. The lateral ledges 60-67 are so placed as to hold a deflector pan or sheet, e.g., the unused grease-catch pan 29 or 96, to prevent undesired drafts from reaching the food on the grill or in the warming chamber previously referred to.

The sideplates 3, 5 also include rectilinear cuts 46, 53, respectively, beginning from the upper edge of the sideplate, and extending downward vertically, for defining a rotational axis for roasting spit 28, see FIG. 1. A second cut 47, 54 runs parallel to the respective first cut 46, 53 in each sideplate 3, 5, and has its lowest point directly beneath and on the vertical with the first cut, for permitting the spit 28 to be placed closer to the fire if desired when the coalboxes 7, 9 are in the horizontal position.

Each of the lower two corners of each sideplate 3, 5 is provided with a block (only three of the four being shown) having a throughbore 68, 69, 70, see FIGS. 2 and 6. The sideplates' throughbores 68-70 coordinate with throughbores in the corner linking blocks 16-19 of the baseplate 1. Pins extend between the sideplates' blocks and the baseplate's blocks 16-19 to connect the baseplate 1 and sideplates 3, 5 in hinged fashion, see FIG. 8. A rack 71, 72 is provided on the outside lower face of each sideplate 3, 5 for the holding of tongs and other cooking utensils. The sideplate support structure includes racks 71, 72 (which also serve as adjusting surfaces) which cooperate with the threaded pins 26, 27 in tabs 24, 25 for vertical adjustment of the sidewalls 3, 5 to allow for unobstructured assembly and placement of the coalboxes 7, 9 relative to the grill's base, i.e., relative to the baseplate 1 and sidewalls 3, 5.

The coalboxes 7, 9 are both identically structured. However, and when in operative combination with the grill's sideplates 3, 5, the coalboxes are disposed in mirror relation relative one to the other, and relative to a vertical center plane that includes spit 28, all as shown in FIG. 5. Each coalbox 7, 9 is a topless cast-iron trough featuring a front opening 73 which can be closed by a hinged damper (not pictured), see FIGS. 1 and 2. The front upper edge of each coalbox 7, 9 is an outwardly extending flange 74 which features at each front corner a hole 75, 76 as means for the insertion of a handle 98, see FIGS. 2 and 3. The handle (not shown) may be fabricated from a thermally insulating material such as hardwood, and includes a hook (not shown) on each end which can be placed into the holes 75, 76 for the lifting of the coalbox, and for pivoting of the coalbox about its pivot axis 103, see FIG. 5. The upper edges of the coalbox's side sections 77, 78 are provided with blocks 79, 80, each having a bore which receives a pin fixed to the lower edge of the coalbox's sidewalls 81, 82, see FIGS. 2 and 3. Each of the coalbox's sidewalls 81, 82 extends above the coalbox's upper edge 74 and includes, as part of the coalbox support means or holding device 31, 32, 51, an outwardly directed one-piece stubshaft 83. As FIG. 3 clearly depicts, the stubshaft 83 is cylindrical in form, and is cut half-away on its end section 84, thereby creating a stop-face 85 parallel to the top edge 74 of the coalbox. The stubshaft 83 with its end section 84 represents the widest part of the coalbox.

Figure 3:
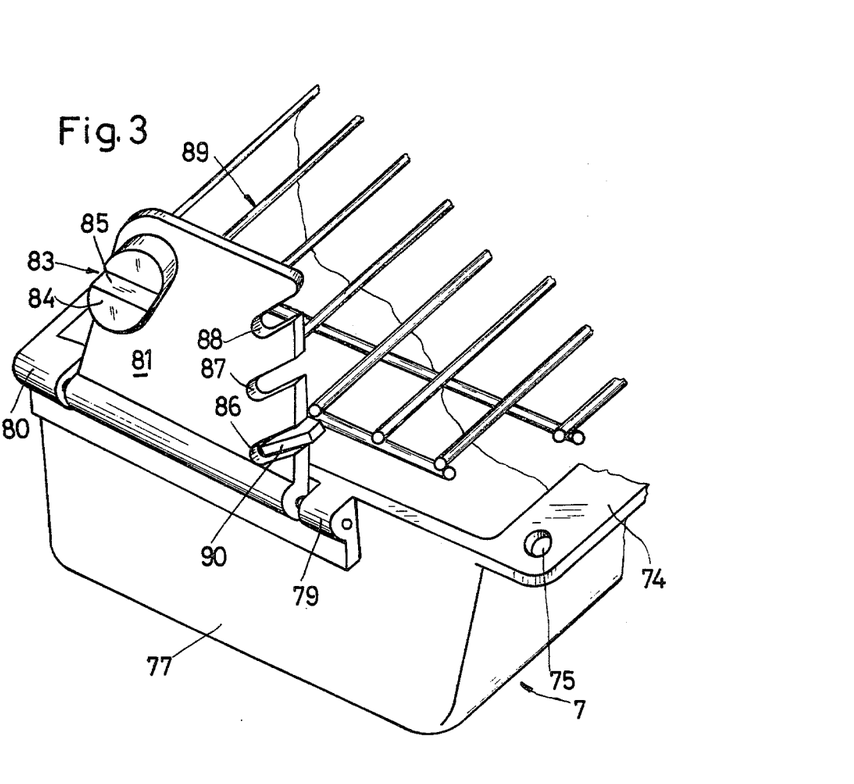
FIG. 3 is an enlarged perspective view of one end of a coalbox; p

A series of parallel angled notches 86, 87, 88 are cut into the front edges of sidewalls 81, 82 of each coalbox 7, 9 for holding a grate 89, see FIG. 3. The grate 89 is provided on its sides with projecting wing tabs 90 that are locatable into one of the notches 86-88, thereby allowing the distance between the grate 89 and the top edge 74 of the coalbox to be changed as desired by the user.

Figure 8:
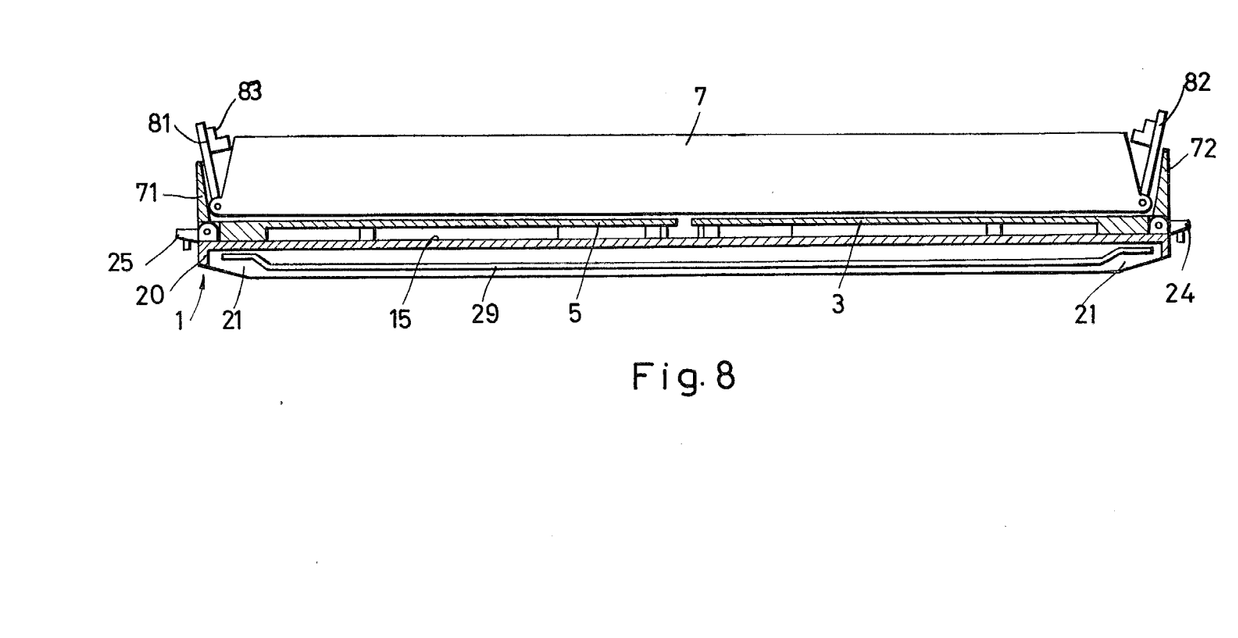
FIG. 8 is a longitudinal cross sectional view of the grill in a storage position.

In use, and in the storage position as shown in FIG. 8, the grill folds up into a very flat position so that it requires little storage space. The height of the reinforcement ribs 21, 22 under the baseplate 1 is great enough so that the pans 29, 96, as shown in FIG. 8, can be placed under the baseplate. The grill's sideplates 3, 5 fold down on top the baseplate 1, and the coalboxes 7, 9 are inverted and positioned on top of the sideplates after the coalboxes' sidewalls 81, 82 have been folded down into ear-like configuration. With legs 11-14 removed from baseplate 1, the FIG. 8 unit is very compact.

For assembly and operation of the grill, the four legs 11-14 are screwed into the corresponding threaded bores 23 of the baseplate 1. The sideplates 3, 5 are raised from their folded FIG. 8 positions upon the baseplate 1 (after removal of the inverted coalboxes 7, 9), and lifted vertically until the racks 71, 72 come in contact with threaded pins 26, 27 in the baseplate 1 for restraining the upraised sideplates in a vertical position. Then the coalboxes' sidewalls 81, 82 are raised to vertical positions as shown in FIG. 3, and the coalboxes are hung upon the desired cradle of each cradle pair 33, 41 and 34, 42 on the inner surface of the sideplates 3, 5 through use of the coalboxes' stubshaft 83, see FIGS. 1 and 5.

According to the first operating position, as depicted in FIGS. 1 and 5, both coalboxes 7, 9 are hung horizontally in mirror relation and in their inner most positions relative to spit 28. In this horizontal position, the pivot axes 103 of both boxes 7, 9 are parallel to the spit 28 axis. The boxes 7, 9 are held in this horizontal position because the half-round outer surfaces 91 of the end sections 84 of the stubshafts 83 rest upon the corresponding upper surface of the striker cams 35, 36 of cradles 33, 34, and the underside of the boxes' bottom surfaces 93 rest upon blocks 94, 95 which extend from the inner surface 30, 50 of the sideplates 3, 5 see FIGS. 2 and 5. Since the stubshafts 83 catch easily on the cradles 33, 34, each coalbox 7, 9 can be easily positioned and repositioned by the insertion of a handle (not shown) in the two holes 75, 76 in the coalboxes' top flange 74. After mounting the coalboxes 7, 9 in the described fashion, the grease-catch pan 29, if so desired, is inserted between the guide ledges 60, 61, the spit 28 is placed into one pair of cuts e.g., 53, 46, and the grill is ready for use. In this first position, both coalboxes 7, 9 are in a horizontal and innermost position, so that a large grill 89 area is created for the preparing of flat meat and poultry items such as bratwursts, steaks, shashliks and the like.

The grill allows for several different operating positions, three of which are illustrated in FIGS. 5–7. In the event that a chicken or other round meat item is to be cooked at the same time as a certain number of steaks, it is desirable to use a second operating position of the grill as shown in FIG. 6. In the FIG. 6 position, coalbox 7 is in a horizontal position while coalbox 9 is in a vertical position with both of the coalboxes remaining in their inner positions with inner cradles 33, 34 relative to spit 28. For tilting of the coalbox 9 from the horizontal to the vertical position it is only necessary to insert the handle (not shown) into one of the provided holes 75, 76 of coalbox 9, and then tilt the box to a 90° angle. This turns the box's stubshafts 83 so that their stop-faces 85 can drop behind the vertical stop-faces 40 of cradle 34. This locks the stubshafts 83 in the cradle 34, and holds the coalbox 9 in a vertical position. This second position, as depicted in FIG. 6, allows a piece of meat previously cooked on spit 28 to be browned by the relative nearness to the coalbox 9, while at the same time allows sausages, steaks and the like to be grilled on coalbox 7. Note in this second position a grease-drip pan 96 can be positioned on ledge 45 to serve coalbox 9, and draft deflector pan 96' can be inserted in guides 62, 63 to further enclose the warming chamber beneath the coalboxes 7, 9 defined by the sideplates 3, 5 and baseplate 1.

A third operating position of the grill is shown in FIG. 7. In this third position coalbox 7 is mounted in an outer position (relative to spit 28) in outer cradles 41, and in a vertical position, while coalbox 9 is retained in its FIG. 6 vertical inner position. The coalbox 7 is moved from the FIG. 6 to the FIG. 7 position by the use of the handle (not shown) inserted in holes 75, 76, the box 7 first being lifted from cradles 33 to cradles 41, and then tilted in cradles 41 as previously described for tilting of coalbox 9 in cradles 34. As is further depicted in FIG. 7, a large grease-catch pan 29 can be placed upon the support ledges 45 so that grease dripping from the meat on spit 28 will not soil the baseplate 1.

The previously described grill can be altered in a number of ways without deviating from the inventor's concept as described in the attached claims. For example, the stubshafts 83 can be fastened to the sidewalls 81, 82 of the coalboxes 7, 9 in such a fashion that the sidewalls are relatively smaller, making the adjustment notches 86–88 for the grate 89 height lower or else completely eliminated. Also, the coalbox support means can be simplified without deviating from the inventor's concept. For example, the flange 74 of each coalbox 7 or 9 can be extended on the sides and can serve to hold the coalbox in a vertical position by guiding it into guide slots (not shown) on the sideplates 3, 5. Further, it would suffice to have a single support ledge, similar to ledge 45, upon which the floor of the coalbox would rest to establish the horizontal position, the vertical position of the coalbox being obtained by simply orienting the coalbox so that a sidewall (not an endwall) rests upon the support ledge (the sidewall being essentially at a right angle to the coalbox's floor).

Having described in detail the preferred embodiment of my invention, what I desire to claim and protect by Letters Patent is:

1. An improved grill device comprising
    a base including a baseplate, and two sideplates extending upwardly from said baseplate,
    a spit,
    spit support means for locating said spit on a horizontal axis relative to said base,
    at least one coalbox swingable on a horizontal axis relative to said base, said spit axis being generally parallel to said coalbox swing axis, and
    coalbox support means partially carried by said coalbox and partially carried by said sideplates for locating said coalbox in one of a vertical and a horizontal position as selected by the user, said coalbox support means including a stubshaft mounted on one of said coalbox and said sideplate, and a cradle mounted on the other of said coalbox and said sideplate, said stubshaft having a flat surface thereon cooperable with a flat surface of said cradle for holding said coalbox in at least said vertical position, said stubshaft axes at each end of said coalbox defining a horizontal pivot axis adjacent one side of said coalbox, said coalbox support means being operative to automatically lock said coalbox in a vertical position with said flat surfaces of said stubshaft and cradle in engagement in response to swinging movement of said coalbox from said horizontal position to said vertical position, and said coalbox support means being operative to automatically secure said coalbox in said horizontal position upon location of said coalbox in said horizontal position.

2. An improved grill device as set forth in claim 1, including
    two coalboxes, each coalbox being swingable on a support axis relative to said base, and each coalbox being supported in the same manner.

3. An improved grill device as set forth in claim 1, in which said coalbox support means is further operative to locate said coalbox in one of an inner or an outer position relative to said spit as selected by the user.

4. An improved grill device as set forth in claim 1, said coalbox being located above said baseplate when said box is in the vertical position a distance sufficient to define a warming chamber beneath said coalbox, said warming chamber being partially enclosed by said baseplate and said sideplates.

5. An improved grill device as set forth in claim 1, including
    a grate for each coalbox, and
    grate support means for supporting said grate in removable relation with said coalbox when said coalbox is in either of said vertical and said horizontal positions.

6. An improved grill device as set forth in claim 5, said grate support means, at each end of said coalbox, comprising
    multiple slots on one of said coalbox and said grate, and a lug on the other of said coalbox and said grate, that slot chosen for receipt of said lug regulating the distance of said grate above the floor of said coalbox.

7. An improved grill device as set forth in claim 1, said spit support means being structured to allow positioning of said spit in one of an upper and a lower position relative to said baseplate.

8. An improved grill device as set forth in claim 1, said device including
   a grease pan, and
   grease pan support means on said side plates for locating said grease pan in horizontal position beneath said coalbox when said coalbox is vertical, thereby defining a warming chamber between said coalbox and said baseplate.

9. An improved grill device as set forth in claim 8, said device including
   a deflector pan, and
   deflector pan support means on said sideplates for locating said pan in a generally vertical position, said pan functioning as a draft deflector in said vertical position.

10. The improved grill device as set forth in claim 1 wherein said two sideplates are pivotally mounted relative to said baseplate for allowing said sideplates to be collapsed into overlying storage relation with said baseplate, and
   plate support structure for positioning and restraining said sideplates in the erect position upon uplifting those sideplates from the storage position.

* * * * *

UNITED STATES PATENT AND TRADEMARK OFFICE
CERTIFICATE OF CORRECTION

PATENT NO. : 4,208,959
DATED : June 24, 1980
INVENTOR(S) : Klaus Schmidt

It is certified that error appears in the above-identified patent and that said Letters Patent are hereby corrected as shown below:

Column 1, line 59, cancel "p" in middle of line

Column 2, line 17, cancel "p" and start new paragraph

Column 2, line 22, after "position" start new paragraph

Column 2, line 55, after "31" insert  -- 32 --

Signed and Sealed this

Fourteenth Day of October 1980

[SEAL]

Attest:

SIDNEY A. DIAMOND

Attesting Officer

Commissioner of Patents and Trademarks

UNITED STATES PATENT AND TRADEMARK OFFICE
CERTIFICATE OF CORRECTION

PATENT NO. : 4,208,959
DATED : June 24, 1980
INVENTOR(S) : Klaus Schmidt

It is certified that error appears in the above-identified patent and that said Letters Patent are hereby corrected as shown below:

On the cover sheet of the patent please add the following:

--/30/   Foreign application priority data

December 31, 1977 Fed. Rep. Germany       2759202 --.

Signed and Sealed this

Eighteenth Day of November 1980

[SEAL]

Attest:

SIDNEY A. DIAMOND

Attesting Officer        Commissioner of Patents and Trademarks